Patented May 5, 1936

2,039,304

UNITED STATES PATENT OFFICE 2,039,304

MANUFACTURE OF ACIDYLATED AROMATIC AMINES

Henry Dreyfus, London, England

No Drawing. Application July 22, 1931, Serial No. 552,421. In Great Britain August 15, 1930

18 Claims. (Cl. 260—124)

This invention relates to improvements in the manufacture of organic compounds and in particular of organic compounds which have a high melting point and/or which are insoluble in aqueous liquids and/or in the common organic solvents.

In U. S. application S. No. 473,781 filed 7th August 1930 I have described and claimed the manufacture of artificial filaments or other products having a subdued, reduced or modified lustre by incorporating therein organic substances in a quantity greater than is soluble in the base, for example cellulose acetate, of which the filaments, ribbons, films or other materials consist or which they contain. The organic substances are preferably substantially insoluble in or incompatible with the cellulose acetate or other base, and moreover insoluble in water or dilute alkalies or acids, and in the organic solvents and preferably have a high melting point, for example above about 240° to 260° C. or even above 290° to 300° C. In U. S. application S. No. 473,781 I have given a large number of substances which are suitable for the purpose and in particular I have specified the acidyl and especially the diacidyl derivatives of benzidine and of like diamino bases, e. g. diacetyl benzidine, dibenzoyl benzidine and diacetyl tolidine.

It is necessary to have the said substances in a fine state of subdivision prior to or during incorporation in the spinning solution, and in fact it is preferable to attain an average particle size of about .0001 to .003 millimetre and preferably an average particle size of about .0005 millimetre. It is difficult to attain such particle sizes in the case of organic compounds, though with inorganic substances, as is well-known, they may readily be produced. It is possible to obtain the required particle size by wet or dry grinding or by solution in strong sulphuric acid followed by precipitation.

The present invention aims to produce the said organic compounds for incorporation in the spinning solutions in as pure a state as possible or at least as white as possible and in a fine state of subdivision. I have now found, and this constitutes the basis of the present invention, that the diacidyl derivatives of aromatic diamino bases may be obtained in a fine state of subdivision during their actual formation.

In order to obtain the said organic compounds in as fine a state of subdivision as possible the base, for example benzidine, from which they are to be prepared, may be dissolved, suspended or dispersed in a suitable liquid, for example water, benzene, toluene, xylene, ether, acetic acid or acetone, so as to form only a dilute solution, suspension or dispersion, and the benzidine or other base treated thereafter with the desired acidylating agent to form the final compound. Further it is preferable to effect the reaction with the acidylating agent at under boiling temperature, for example at a temperature of 30 to 80° C., and preferably 35 to 60° C., as the boiling apparently affects the fineness of the particles obtained. It is preferable to employ as the medium in which the acidylation is to be effected a medium which is a solvent for the initial base, for example benzidine, and is a non-solvent for the final product. In this way the diacidylated aromatic diamino base is precipitated out directly from the reaction mixture in the required form. The choice of a suitable liquid medium presents no difficulties, since the diacidylated aromatic diamino bases are in general insoluble in all the common organic solvents.

It is further found that very good results may be obtained by adding the benzidine or other diamino base to the main bulk of the acidylating agent. By this means the acidylating agent is always present in excess, thus apparently obviating possible formation of a mono acidyl product which may lead to the production of the diacidylated base in a somewhat less finely divided form than where the diacidylated base is formed directly. In any event it is preferable to employ the acidylating agent in a proportion in excess of that theoretically necessary for the formation of the diacidyl derivative and preferably in only a slight excess.

It is further of advantage to effect the acidylation in presence of a suitable wetting agent or to treat the formed product with the wetting agent. As examples of suitable wetting agents may be mentioned sulphonated and preferably highly sulphonated aliphatic hydrocarbons, acids or alcohols, sulphonated naphthalene compounds, e g. naphthalene-formaldehyde sulphonic acid or alkylated naphthalene sulphonic acids, and the sulphonated amides of higher fatty acids, for instance the sulphonated ethylene diamide of oleic acid.

Further means of ensuring that the diacidylated aromatic diamino base shall be formed in a very finely divided form is to effect its formation in presence of compounds which inhibit aggregation or subsequent aggregation of the particles of organic compound as formed and thereby act in a similar manner to the protective colloids in the formation of aqueous colloidial solutions.

For this purpose it is highly convenient to employ as the inhibiting substances cellulose acetate or other cellulose derivative from which the spinning solution is to be prepared and in fact the diacidylated base may be formed in the actual spinning solution itself.

The cellulose acetate or other cellulose derivative may be employed in any suitable solution so as to inhibit aggregation. Such solution may, for instance, be the primary acetylation or esterification solution in which the cellulose acetate or other cellulose ester is formed. For instance cellulose may be acetylated with the usual excess of acetic anhydride and benzidine or other diamino base acetylated in the cellulose acetylation liquor with or without previous ripening of the cellulose acetate. If the acetylation of the diamino base is effected before ripening of the cellulose acetate the excess of acetic anhydride already in the reaction mixture may be utilized for this acetylation. If, on the other hand, ripening is effected before addition of the benzidine or other diamino base a further quantity of acetic anhydride may be added. In such a method of formation of a diacetyl aromatic diamino base, for example diacetyl benzidine, the sulphuric acid or other catalyst employed for the acetylation of cellulose may be used to accelerate the acetylation of the benzidine or other diamino base or may be neutralized or substantially neutralized before carrying out the acetylation of the benzidine, especially when the temperature to which the whole mixture may rise or be raised in order to effect the acetylation of the benzidine or other base is liable, in conjunction with the catalyst used for the acetylation of the cellulose, to have an undesired action upon the cellulose acetate.

In this manner the insoluble diacetyl benzidine or diacetyl aromatic diamino base is obtained in a finely divided form in the midst of the solution of the cellulose acetate, and when the cellulose acetate is precipitated, as for example by mixing with water or other non-solvent medium, the diacetyl benzidine or the like is carried down and is retained by the cellulose acetate. The fine dispersion of the diacetyl benzidine or the like in cellulose acetate obtained by the above process is very suitable for subsequent solution in acetone or other suitable solvent for the manufacture of spinning solutions for spinning artificial filaments, yarns, ribbons, etc., by dry or wet spinning methods.

As a further alternative the benzidine or other base may be acetylated in any other suitable solution of cellulose acetate or other cellulose derivative, for example in the spinning solution itself, e. g., solution of cellulose acetate in acetone.

The acidylation according to the present invention may be effected by any suitable acidylating agent, for example an acid chloride, an acid anhydride or the acid itself. The use of acid anhydrides for this purpose, and particularly the aliphatic acid anhydrides for the preparation of dialiphatic acidyl derivatives of benzidine and other diamino bases, is, so far as I am aware, an entirely novel method of preparation and forms an important part of the present invention.

In the case of acidylating with the aid of acid chlorides, for example acetyl chloride or benzoyl chloride, the reaction may be effected in presence of a suitable base, preferably one which is not itself capable of acidylation, for example pyridine, dimethyl aniline, diethylamine and other tertiary organic bases, or chalk, caustic soda or other inorganic bases. Where the base employed is a liquid it may constitute the whole or the bulk of the medium in which the acidylation takes place. Even in the case of acidylating with the aid of acid anhydrides a base may be present in the reaction mixture.

As suitable diamino bases for use as initial materials in the process of the present invention benzidine and tolidine have already been instanced, and the phenylene diamines, and particularly para-phenylene diamine, may be mentioned as further examples, whilst as further examples of acid radicles which may be introduced in addition to the acetyl and benzoyl radicles already referred to the phthalyl and oxalyl radicles may be mentioned, though it appears to be preferable to employ as acidylating agents acid halides, anhydrides or the acids themselves corresponding to mono basic acids. Instead of introducing the same acid radicle into both amino groups of the diamino base different acid radicles may be introduced, as for example an acetyl radicle into one amino group and a benzoyl radicle into the other. Such acidylation may be carried out in one or two stages.

Where the diacetyl benzidine, dibenzoyl benzidine, diacetyl tolidine or other diacidyl aromatic diamino base has not been prepared in the presence of the cellulose acetate or other base to be used for making up the spinning solution, it may after separation from the medium in which it has been prepared be ground either wet or dry, if desired, so as still further to reduce the particle size, and/or it may be worked directly with the solvent to be used for making up the spinning solution, for instance acetone, or with the whole or a part of the spinning solution itself. For example diacetyl benzidine obtained in precipitated form from acetylation of benzidine in a xylene medium may be rubbed up with acetone with or without previous grinding, and the paste thereafter incorporated in the spinning solution of cellulose acetate in acetone. Diacetyl benzidine or other diacidyl aromatic diamino base obtained already dispersed in cellulose acetate or other spinning base may be used directly for making up the spinning solution or may be added to an already formed spinning solution or to the solvent therefor, depending on the proportion of diacetyl benzidine or the like to cellulose acetate or other base used in its manufacture and upon the quantity desired in the final filaments, threads or other products.

For the preparation of the diacidyl aromatic diamino bases in as pure and white a state as possible, it is obviously desirable to employ comparatively pure starting materials, and for this purpose the benzidine or other base may be purified before acetylation or acidylation in any desired away. The commercial product is very often somewhat coloured and may be suitably decolourized by boiling a solution thereof with animal charcoal, active carbon, silica gel, or other suitable decolourizing agent. After boiling the solution may if desired be filtered through a cake of suitable decolourizing agent, and the whole process may be repeated as many times as is desirable. A further method of purification consists in simple distillation.

The following examples illustrate the invention but are not to be considered as limiting it in any way:—

Example 1

A quantity of benzidine is dissolved in boiling water and animal charcoal added. After a short boil the liquid is filtered hot and the benzidine allowed to crystallize out. When cold it is filtered off and the process repeated. 100 parts of the purified benzidine are dissolved in 2000–5000 parts of xylene by warming. The solution may then be filtered, if necessary, and to the warm solution are added 220 parts of acetic anhydride with vigorous stirring. The precipitated diacetyl benzidine is filtered quickly, washed with xylene and then with acetone and is then ready for incorporation in the spinning solution, or alternatively it may be further broken down by milling.

Example 2

100 parts of benzidine purified as described in Example 1 are dissolved in 1000 to 2000 parts of xylene by warming and the whole solution is added slowly to a warm solution of 220 parts of acetic anhydride in 1000 to 2000 parts of xylene with vigorous stirring. The precipitated diacetyl benzidine is thereafter treated as in Example 1.

Example 3

200 parts of crude benzidine are dissolved in 2000 parts of methylated spirit, 50 parts of sodium sulphite and 50 parts of an active carbon for instance that sold under the trade name Norit XXX.EF added, and the whole refluxed for half an hour. A paste is made up of the active carbon with methylated spirit and formed into a smooth cake on a suitable filter and washed with methylated spirit. The solution of the benzidine is filtered through the active carbon cake, and the cake finally washed with warm methylated spirit. The whole filtrate is then made up to 4000 to 4500 parts with methylated spirit, and 110 parts of chalk and 6 to 10 parts of oleyl diethylethylene diamine added. The temperature of the benzidine solution is raised to 52° C. and a solution of 335 parts of benzoyl chloride in an equal weight of methylated spirit, which mixture has been prepared immediately before use, is added rapidly and the whole further heated with stirring. On testing a portion of the reaction mixture with nitrous acid and R salt (salt of 2-naphthol-3:6-di-sulphonic acid), the absence of a red colouration shows that the reaction is complete. The dibenzoyl benzidine is filtered, washed with warm methylated spirit, the product stirred with dilute hydrochloric acid and warm water, filtered and washed. Finally the remaining water is displaced with acetone, the acetone paste milled and the whole incorporated in the spinning solution.

Example 4

Commercial benzidine is purified by two successive distillations. Crude pyridine is fractionated with the aid of a fractionating column and is then distilled in presence of benzoyl chloride in order to remove undesired impurities which react with benzoyl chloride. 100 parts of the purified benzidine are dissolved in 2000 to 2500 parts of purified pyridine, 185 parts of benzoyl chloride are separately dissolved in 250 to 350 parts of pyridine. The pyridine solutions of the benzidine and the benzoyl chloride are then mixed with agitation. The reaction mixture is kept at a temperature of 90 to 100° C. for several hours to complete the benzoylation, then allowed to cool and filtered. The completion of the reaction may be ascertained and the product worked up as described in the preceding example.

Example 5

50 parts of benzidine purified as described in Example 3 or 4 above are converted into an aqueous paste and are suspended in 1000 to 2000 parts of water. 130 to 135 parts of finely ground benzoic anhydride are stirred in slowly to the cold suspension at a temperature of 20 to 30° C. during 2 to 3 hours. The whole is then gradually heated up with stirring to 90° C. for a further period of 3 hours until the benzoylation is complete (ascertained as described in Example 3 above). The hot liquors are made slightly alkaline with caustic soda, filtered, and the dibenzoyl benzidine washed with hot water, dried and worked with acetone as described in Example 3.

Example 6

100 parts of cellulose are acetylated in known manner with 300 parts of acetic anhydride in presence of 500 parts of glacial acetic acid and 7 to 15 parts of sulphuric acid. The cellulose may of course be pretreated in known manner with formic or acetic acid or the like. When the acetylation is complete a solution of 1.6 parts of benzidine in 100 parts of glacial acetic acid are added slowly while stirring. When the reaction is complete (ascertained by a test sample as described in Example 3) water is added as in the known art for ripening, and the cellulose acetate precipitated with water or with dilute acetic acid to obtain the desired suspension of diacetyl benzidine in cellulose acetate. The latter is then further worked up for the preparation of the spinning solution in the usual manner.

The term diamino-diphenyl base used in the accompanying claims covers any base containing two radicles of the benzenoid series linked as in benzidine or tolidine.

What I claim and desire to secure by Letters Patent is:—

1. Process for the manufacture of diacidylated aromatic bases, comprising effecting acidylation of a diamino-diphenyl base at below boiling temperatures, in an excess of an inert liquid medium which is a nonsolvent for the diacidylated aromatic base.

2. Process for the manufacture of diacidylated aromatic bases, comprising effecting acidylation of a diamino-diphenyl base, at below boiling temperatures with an excess of the acidylating agent, in an excess of an inert liquid medium which is a nonsolvent for the diacidylated aromatic base.

3. Process for the manufacture of diacidylated aromatic bases, comprising effecting acidylation of a diamino-diphenyl base at below boiling temperatures, in a dilute solution which is a nonsolvent for the diacidylated aromatic base.

4. Process for the manufacture of diacidylated aromatic bases, comprising effecting acidylation of a diamino-diphenyl base at below boiling temperatures in a dilute solution which is nonsolvent for the diacidylated aromatic base with an excess of the acidylating agent.

5. Process for the manufacture of diacidylated aromatic bases, comprising effecting acidylation of a diamino-diphenyl base in dilute solution in a solvent which is a nonsolvent for the diacidylated amino base, at below boiling temperatures with an excess of the acidylating agent.

6. Process for the manufacture of diacidylated aromatic bases, comprising effecting acidylation of a diamino-diphenyl base by adding the base in an excess of inert liquid medium which is a nonsolvent for the diacidylated aromatic base to the bulk of the acidylating agent, and maintaining the temperature at below the boiling point of the mixture.

7. Process for the manufacture of diacidylated aromatic bases, comprising effecting acidylation of a diamino-diphenyl base at below boiling temperatures with an excess of an acid halide, in an excess of an inert liquid medium which is a nonsolvent for the diacidylated aromatic base.

8. Process for the manufacture of diacidylated aromatic bases, comprising effecting acidylation of a diamino-diphenyl base at below boiling temperatures with an excess of an acid chloride, in an excess of an inert liquid medium which is a nonsolvent for the diacidylated aromatic base.

9. Process for the manufacture of diacidylated aromatic bases comprising effecting acidylation of a base selected from the group consisting of benzidine and tolidine by means of benzoyl chloride at below boiling temperatures in the presence of an excess of an inert liquid medium which is a nonsolvent for the diacidylated aromatic base.

10. Process for the manufacture of diacidylated aromatic bases, comprising effecting acidylation of a diamino-diphenyl base at below boiling temperatures in an excess of an inert liquid medium which is a nonsolvent for the diacidylated aromatic base with an excess of an acid anhydride.

11. Process for the manufacture of diacidylated aromatic bases comprising effecting acidylation of a base selected from the group consisting of benzidine and tolidine by means of a lower aliphatic acid anhydride at below boiling temperatures in the presence of an excess of an inert liquid medium which is a non-solvent for the diacidylated aromatic base.

12. Process for the manufacture of diacidylated aromatic bases, comprising effecting acidylation of a diamino-diphenyl base in an excess of an inert liquid medium which is a nonsolvent for the diacidylated aromatic base and in the presence of a tertiary organic base, at below boiling temperatures.

13. Process for the manufacture of diacidylated aromatic bases comprising effecting acidylation of a base selected from the group consisting of benzidine and tolidine by means of a lower aliphatic acid anhydride at below boiling temperatures in the presence of an excess of an inert liquid medium which is a non-solvent for the diacidylated aromatic base, and in the presence of a tertiary organic base.

14. Process for the manufacture of diacidylated aromatic bases comprising effecting acidylation of a base selected from the group consisting of benzidine and tolidine by means of benzoyl chloride at below boiling temperatures in the presence of an excess of an inert liquid medium which is a non-solvent for the diacidylated aromatic base, and in the presence of a tertiary organic base.

15. Process for the manufacture of diacidylated aromatic bases, comprising effecting acidylation with an excess of the acidylating agent, of a diamino-diphenyl base in an excess of an inert liquid medium which is a nonsolvent for the diacidylated aromatic base and in the presence of a tertiary organic base, at below boiling temperatures.

16. Process for the manufacture of diacidylated aromatic bases, comprising effecting acidylation of a diamino-diphenyl base in an excess of an inert liquid medium which is a nonsolvent for the diacidylated aromatic base and in the presence of cellulose acetate, at below boiling temperatures.

17. Process for the manufacture of diacidylated aromatic bases, comprising effecting acidylation of a diamino-diphenyl base in the presence of a cellulose ester in an esterification mixture, at below boiling temperatures.

18. Process for the manufacture of diacetyl benzidine, comprising acetylating benzidine in a dilute solution which is a nonsolvent for the diacetyl benzidine at below boiling temperatures with an excess of acetic anhydride.

HENRY DREYFUS.